United States Patent [19]

Bart

[11] Patent Number: 5,157,915
[45] Date of Patent: Oct. 27, 1992

[54] POD FOR A TURBOFAN AERO ENGINE OF THE FORWARD CONTRAFAN TYPE HAVING A VERY HIGH BYPASS RATIO

[75] Inventor: Jacques R. Bart, Evry, France

[73] Assignee: Societe Nationale d'Etude et de Construction de Motors d'Aviation, Paris, France

[21] Appl. No.: 684,213

[22] Filed: Apr. 12, 1991

[30] Foreign Application Priority Data

Apr. 19, 1990 [FR] France ................. 90 04991

[51] Int. Cl.$^5$ ............................................. F02C 7/20
[52] U.S. Cl. ................................ 60/39.31; 244/54; 60/226.1
[58] Field of Search ............... 60/39.31, 226.1; 244/53 R, 54, 129.4

[56] References Cited

U.S. PATENT DOCUMENTS

| | | | |
|---|---|---|---|
| 3,511,055 | 5/1970 | Timms | 60/39.31 |
| 4,037,809 | 7/1977 | Legrand | 244/54 |
| 4,055,041 | 10/1977 | Adamson et al. | 60/39.31 |
| 4,147,029 | 4/1979 | Sergisson | 244/54 |
| 4,940,196 | 7/1990 | Lardellier | 244/54 |

FOREIGN PATENT DOCUMENTS

| | | |
|---|---|---|
| 0314568 | 5/1989 | European Pat. Off. . |
| 2309402 | 11/1976 | France . |
| 2379433 | 9/1978 | France . |
| 2560854 | 9/1985 | France . |

OTHER PUBLICATIONS

Aviation Week and Space Technology, 6 pages, Jun. 28, 1982, D. E. Fink, "Powerplants of Next Century Studied".

*Primary Examiner*—Richard A. Bertsch
*Assistant Examiner*—Michael I. Kocharov
*Attorney, Agent, or Firm*—Oblon, Spivak, McClelland, Maier & Neustadt

[57] ABSTRACT

A pod for a very high bypass ratio turbofan engine unit of the forward contrafan type suspended from a suspension mast under the wing of an aircraft comprises a generally cylindrical inner cowling surrounding the casing of the jet engine unit and a generally cylndrical outer cowling spaced outwardly of the inner cowling and defining therebetween the cold flow path in which the contrarotating fan propellers are located, the outer cowling being divided into three parts consisting of an openable forward casing surrounding the fan propellers and connected to the suspension mast, an intermediate casing rigidly connected to the engine casing by radial flow straightener arms disposed in the cold flow path to the rear of the fan propellers, and an openable rearward casing also connected to the suspension mast. The engine unit is attached to the suspension mast by first attachment means carried on top of the intermediate casing, and second attachment means provided on the rear part of the engine casing. Coupling means are provided for rigidly connecting each of the forward and rearward casings to the intermediate casing when the engine unit is attached to the suspension mast and the forward and rearward casings are both closed.

9 Claims, 7 Drawing Sheets

POD FOR A TURBOFAN AERO ENGINE OF THE FORWARD CONTRAFAN TYPE HAVING A VERY HIGH BYPASS RATIO

BACKGROUND OF THE INVENTION

1. Field of the Invention

The present invention relates to the mounting of very high bypass ratio turbofan engine units of the forward contrafan type under the wings of aircraft, and to engine pods adapted for this purpose.

In particular the invention relates to a pod for a very high bypass ratio turbofan engine unit of the forward contrafan type suspended from a suspension mast under the wing of an aircraft, said engine unit including an engine casing, a pair of ducted fans having contrarotating propellers disposed at the forward end of said engine unit, and radial flow straightener arms extending radially outwards from said engine casing to the rear of said propellers, said pod comprising an inner cowling of generally cylindrical shape surrounding said engine casing, and an outer cowling also of generally cylindrical shape, said outer casing having an outer side forming the outer wall of said pod and an inner side spaced radially outwardly from said inner cowling and defining therebetween the cold flow path of said engine unit in which said contrarotating propellers and said flow straightener arms are located.

2. Summary of the Prior Art

It is known to mount a turbofan bypass engine of the forward fan type under the wing of an aircraft at the end of a mast suspended from the wing. Such an arrangement is shown in French Patent No. 2,560,854, in which the fan casing is secured to the engine casing by struts and the engine casing is secured at two attachment points to the suspension mast, the first attachment point being situated at the front of the engine casing and the other at the rear of the said engine casing. In this arrangement the mast has a lower part which extends longitudinally and vertically in the cold flow path of the air propelled by the fan, which brings about an undesirable drag during flight.

Moreover, the fan casing, which is integral with the outer cowling of the pod, impedes easy access to the mounting means of the tubojet engine unit during fitting and removal of the engine.

U.S. Pat. No. 4,037,809 discloses a pod for a conventional bypass engine in which the fan casing is integral with the engine casing and is fixed to the mast by fixing means, and in which the rear part of the outer cowling is detachable from the fan casing and is mounted on the mast in a manner such that it can slide rearwards during ground maintenance.

This arrangement applied to a fanjet engine of the forward contrafan type having a very high bypass ratio would not permit easy access to the contrarotating fan propellers or to the reducing gear driving the propellers, since the fan casing is integral with the engine casing. Moreover, the coupling of the rear part of the outer cowling to the fan cowling requires a special joining strip of trapezoidal section.

French Patent No. 2,622,507 relates to a method of mounting a very high bypass ratio turbofan engine of the rear contrafan type under the wing of an aircraft, in which the engine unit is suspended by means of a mast having two arms arranged in a vertical plane containing the longitudinal axis of the engine unit, the upper ends of the arms being rigidly fixed to a structural box of the wing, and the lower ends being rigidly connected to a longitudinal lifting bar arranged between the engine casing and the inner cowling. The engine unit is hitched to the lifting bar at the upstream end of the latter on the engine casing in line with the inlet guide vanes, and at the downstream end on the transition structure arranged between the low pressure turbine and the free turbines driving the contrarotating propellers. In this arrangement both suspension arms are also arranged in the cold air flow path and create an undesirable drag. Ground maintenance is facilitated by the fact that the outer cowling of the pod is attached to the suspension mast or to the structural box of the wing by means of transverse brackets, and this cowling is circumferentially divided into three 120° sectors, the upper sector being integrated into the wing structure, and the two lateral sectors of the cowling having movable cowls which can be raised laterally about longitudinal hinges fixed on the upper sector and which can be locked together at the bottom. Rigidification of this openable outer cowling is achieved by means of radial structural arms mounted at the front and at the rear end of the pod. These arms are rigidly connected to the engine casing and pass through the cold air flow path, thus creating an additional undesirable drag.

SUMMARY OF THE INVENTION

It is an object of the present invention to provide a pod of the type hereinbefore described which obviates the mentioned drawbacks of the known pods and permits, inter alia. a reduction of drag, as well as a lessening of the time required to mount or remove the turbojet engine unit.

To this end, according to the invention, the outer cowling of the pod comprises a forward casing forming the front part of said pod and surrounding said fan propellers, said forward casing being rigidly connected to said suspension mast and being openable to facilitate maintenance work, a structural intermediate casing situated to the rear of said forward casing and rigidly connected to said engine casing bY means of said flow straightener arms, and a rearward casing situated to the rear of said intermediate casing and rigidly connected to said suspension mast, said rearward casing also being openable to facilitate maintenance work, said engine unit has first and second attachment means by which said engine unit is hitched to said suspension mast, said first attachment means being provided on the upper part of said intermediate casing, and said second attachment means being provided on the rear part of said engine casing, and said pod includes first coupling means for rigidly connecting said forward casing to said intermediate casing when said engine unit is hitched to said suspension mast and said forward casing is closed, and second coupling means for rigidly connecting said rearward casing to said intermediate casing when said engine unit is hitched to said suspension mast and said rearward casing is closed.

As a result of this arrangement, only a small part of the suspension mast, i.e. that which is situated in the vicinity of the rear attachment point, is situated in the cold flow path. In operation, the forward casing and the rearward casing are coupled to the intermediate casing, which is very rigid. It is thus no longer necessary to provide additional radial stiffening arms which, as in the prior art, create an additional drag and hinder access to the engine attachment points during mounting and removal of the engine. The ability to open the forward casing makes it possible to gain easy access to the contrarotating propellers and to the reduction gear driving these propellers. Removal of these forward situated propellers is easy. Access to the forward attachment point situated above the intermediate casing may then be gained from the front and from the rear, the forward casing and the rearward casing having been opened and the contrarotating propellers removed. Access to the rear attachment point is possible as soon as the rearward casing has been opened.

Other features and advantages of the invention will become ap parent from the following description of the preferred embodiment with reference to the attached drawings.

DESCRIPTION OF THE PREFERRED EMBODIMENT

Figure 1:
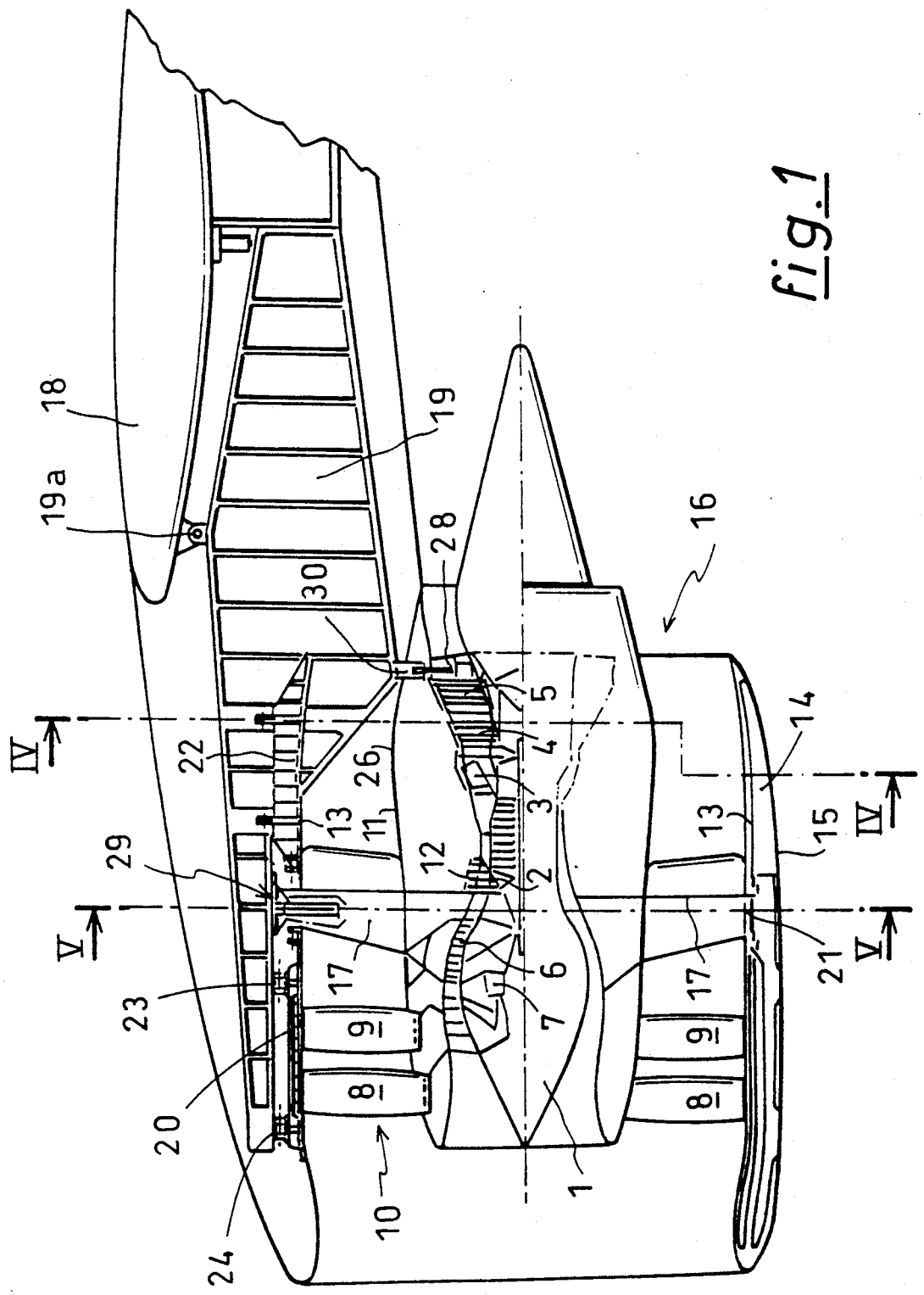
FIG. 1 is an axial longitudinal sectional view of a turbojet bypass engine of the forward contrafan type mounted in one embodiment of the pod in accordance with the invention.

FIG. 1 shows diagrammatically a turbojet engine 1 comprising a gas generator consisting of a high pressure compressor 2 delivering compressed air to an annular combustion chamber 3 where it is mixed with fuel and burnt so as be expanded and supply part of the energy thus accummulated to a high pressure turbine 4 drivinq the compressor 2. To the rear of the high pressure turbine 4 a low pressure turbine 5 is arranged to utilise the energy of the air flowing from the high pressure turbine 4 in order to drive a low pressure compressor 6 situated upstream of the high pressure compressor 2, and also a reducing gear 7 which drives two contrarotating propellers 8 and 9 mounted at the forward end of the turbojet engine unit 1. These propellers 8,9 act on cold air in a secondary annular flow path 10 situated radially outwardly of an inner cowling 11 of generally cylindrical shape surrounding the engine casing 12. The secondary flow path 10, which is defined inwardly by the inner cowling 11, is defined outwardly by the inner side 13 of an outer cowling 14. The outer side 15 of the cowling 14 forms the outer jacket of the pod 16 in which the engine unit 1 is mounted. Flow straightening radial arms 17 are disposed in the secondary flow path 10 to the rear of the contrarotating propellers 8 and 9, these arms 17 extending outwards from the portion of the engine casing 12 situated in the vicinity of the high pressure compressor 2 and the low pressure compressor 6. The turbojet engine unit shown is of the type referred to as a forward contrafan engine and has a very high bypass ratio.

The suspension of the turbojet unit 1 below the wing 18 of an aircraft, as well as the construction of the outer cowling 14, will now be described with reference to FIGS. 1 to 8.

A suspension mast 19 is suspended from the structural beam of the wing 18 by means of axles 19a and an attachment structure of conventional type.

As will be clearly seen, the outer cowling 14 of the pod 16 has, from front to rear, a forward casing 20 forming the front part of the pod 16 and surrounding the contrarotating propellers 8 and 9, an intermediate casing 21 rigidly connected to the engine casing 12 by means of the flow straightening radial arms 17, and a rearward casing 22 situated at the rear end of the pod 16 and carrying thrust reverser devices which are not shown in the drawings.

The intermediate casing 21 forms an integral part of the engine unit 1. The forward casing 20 and the rearward casing 22, on the other hand, are firmly connected to the suspension mast 19, and are divided at circumferentially spaced intervals into streamlined sectors so that the said casings may be opened to facilitate ground maintenance of the engine unit 1, and especially the mounting and removal of the engine.

The forward casing 20 is divided into three sections 20a, 20b and 20c of 120° each. The upper sector 20a is disposed symmetrically relative to the longitudinal vertical plane passing through the axis of the engine 1, and is rigidly connected to the suspension mast 19 by means of transverse brackets 23 and 24, shaped like clothes hangers, arranged respectively at the front and at the rear of the upper sector 20a and attached to the upper part thereof. The two lower sectors 20b and 20c form movable shells which are pivoted at their upper edges on fittings 25 rigidly connected to the ends of the transverse brackets 23 and 24, the said fittings 25 forming the longitudinal edges of the upper sector 20a. By means of hinge joints, the two movable shells 20b and 20c can be opened outwardly and upwardly so as to permit easy access to the engine, or can be closed and locked together at their lower edges by locking means 20d of known type.

Figure 3:
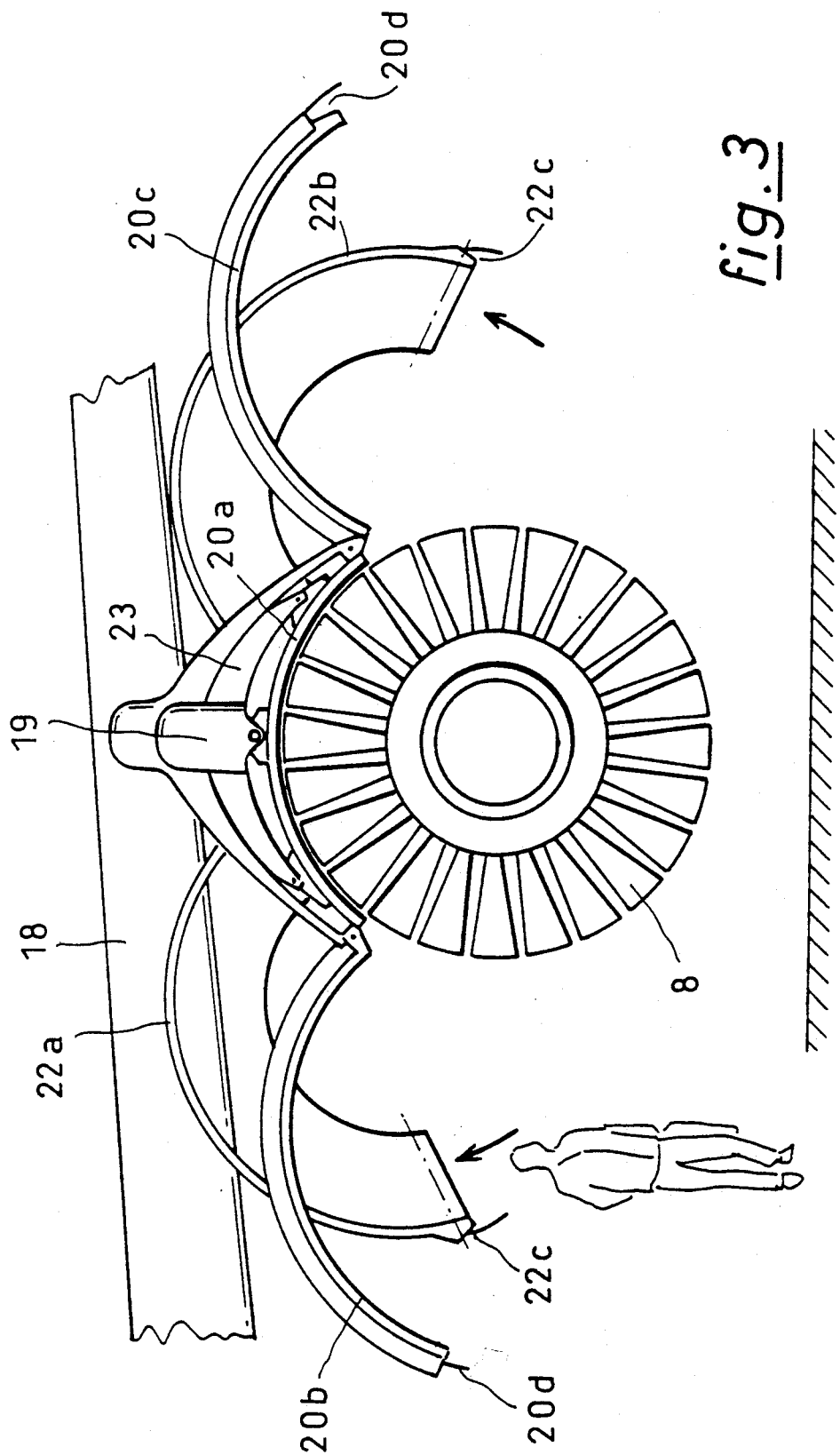
FIG. 3 is a front view of the turbojet engine unit suspended below the wing of the aircraft, showing the movable parts of the outer cowling of the pod opened.
Figure 4:
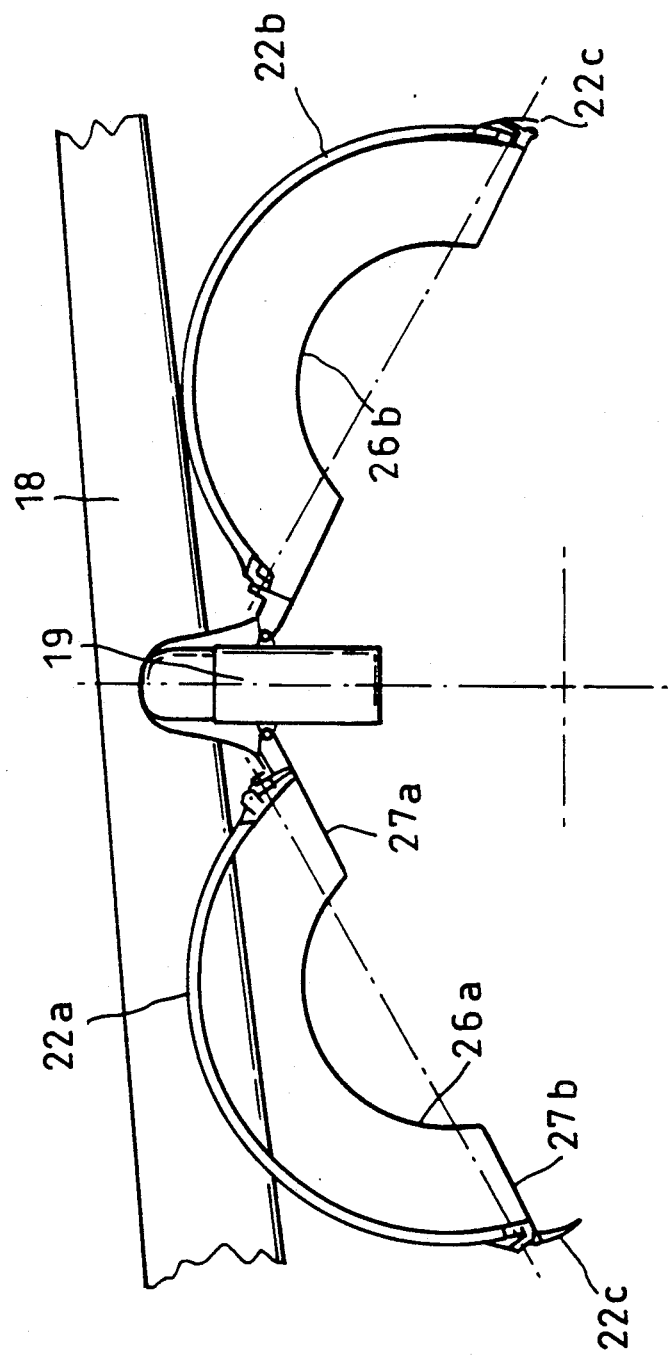
FIG. 4 is a cross-section on the line IV—IV in FIG. 1 showing the rearward casing in an open position.
Figure 5:
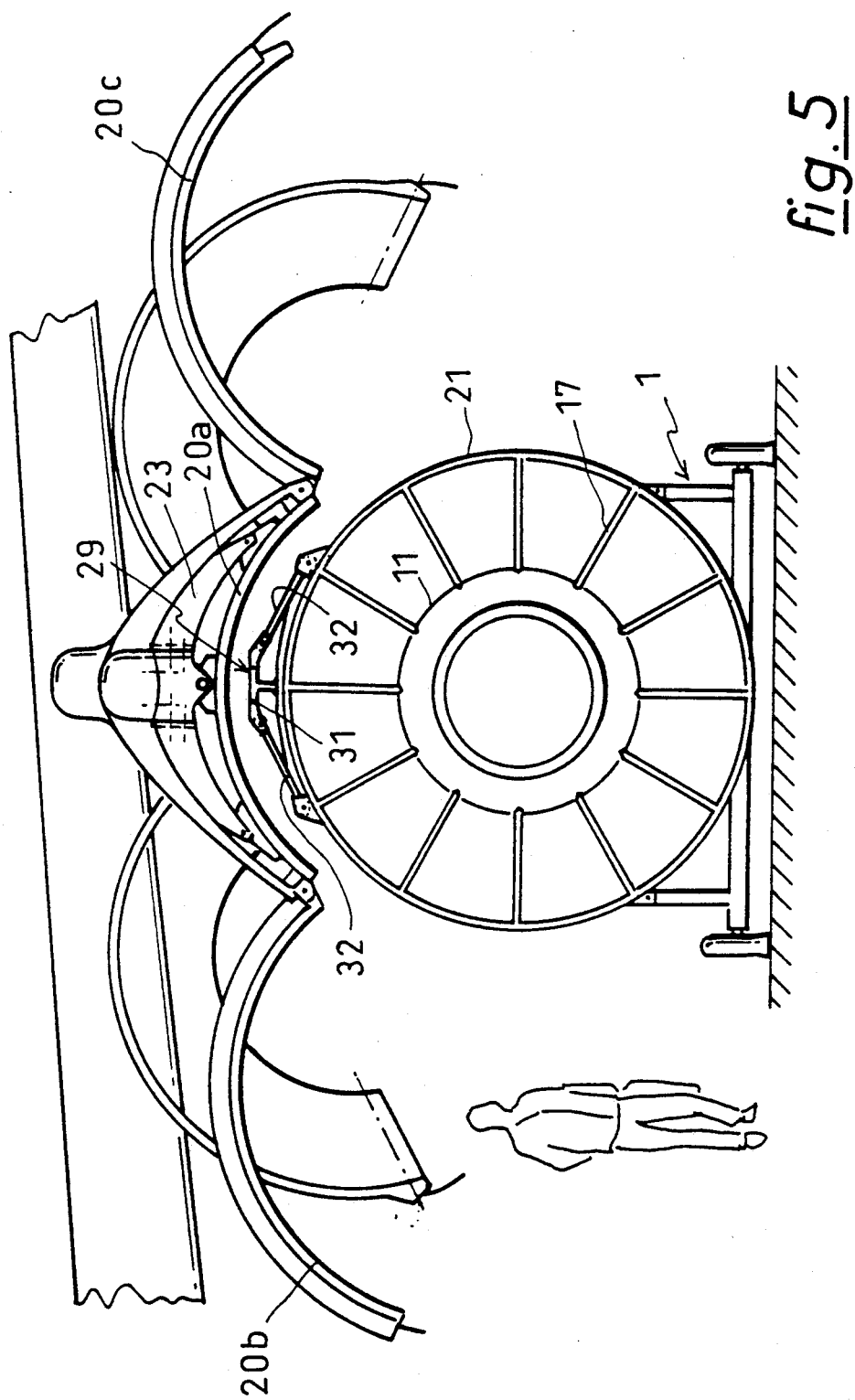
FIG. 5 is a front view similar to FIG. 3, showing the intermediate casing disconnected from the suspension mast and represented in the plane V-V of FIG. 1.

The rearward casing 22 is divided into two streamlined sectors 22a and 22b which are of semi-cylindrical shape and are pivotally mounted on the suspension mast 19 at their upper edges so that they can be opened outwards as shown in FIGS. 3 to 5 or closed together and locked at their bottom edges by locking means 22c of known type. Advantageously the rear ring 26 of the inner cowling 11 may be formed by two semi-cylindrical parts 26a and 26b, each of which is rigidly fixed to the corresponding one of the movable sectors 22a or 22b of the rearward casing by radial arms 27a and 27b as shown in FIG. 4. The opening of the two movable sectors 22a and 22b therefore simultaneously opens the rear part of the inner cowling 11 to uncover the rear part 28 of the engine casing 12, which is in fact the engine exhaust casing.

The engine unit 1 is fixed to the suspension mast 19 by first and second attachment means 29 and 30, the first attachment means 29 being situated at the top of the intermediate casing 21 and the second attachment means 30 being situated immediately above the rear 28 of the engine casing 12. As will be seen more clearly in FIGS. 5 and 6, each attachment means comprises a removable plate 31 which can be fixed to the suspension mast 19 by fixing means in a known manner, and suspension links 32 which connect, also in a known manner, the removable plate 31 either to the intermediate casing 21 or to the exhaust casing 28, the suspension links 32 taking up circumferential stresses, the axial thrust of the engine and also the weight of the engine.

When the engine unit 1 is suspended from the suspension mast 19 by the two attachment means 29 and 30, and when the forward and rearward casings 20 and 22 are closed, the two casings 20 and 22 are rigidly connected to the intermediate casing 21 by coupling means 32a and 32b respectively arranged at opposite ends of the intermediate casing 21.

Figure 2B:
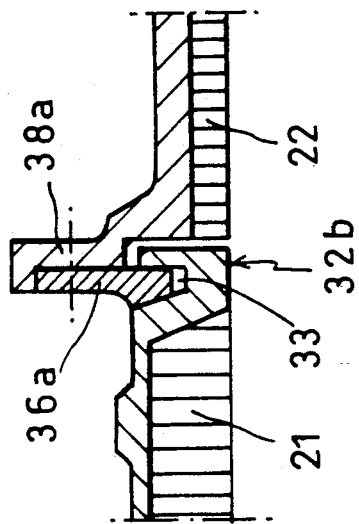
FIG. 2b is a scrap sectional view illustrating the method of coupling the rearward casing to the intermediate casing of the pod.
Figure 2A:
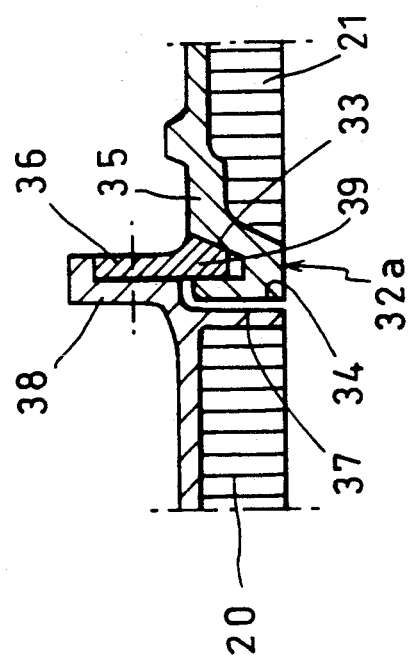
FIG. 2a is a scrap sectional view illustrating the method of coupling the forward casing to the intermediate casing of the pod.

As will be seen from FIG. 2a, which shows on a large scale the coupling means 32a for securing the forward casing 20 to the intermediate casing 21, the intermediate casing 21 has an annular groove 33 near its forward end face 34. This annular groove 33 opens outwardly in the outer cylindrical face 35 of the intermediate casing 21, and has a sloping rear face providing the groove with a trapezoidal axial cross-sectional profile which narrows in the inward direction. The annular groove is intended to receive the inner edge of a ring 36 which is rigidly connected to the forward casing 20 so that it is disposed to the rear of the rear end face 37 of the forward casing 20 which faces the forward end face 34 of the intermediate casing 21. For this purpose, the forward casing 20 has a collar 38 which extends outwards to the rear of the rear end face 37 of the casing 20 so that it surrounds the front end of the intermediate casing 21. The ring 36 is fixed to this collar 38, for example by bolting. Since the forward casing 20 is divided into three sectors 20a, 20b and 20c, the ring 36 is also cut into three sectors, the sectoral parts of the ring 36 being fixed to the corresponding sectoral parts of the collar 38 so that the inner portions 39 thereof extend radially inwards in an overhanging manner to form jaw-like flanges which cooperate with the annular groove 33 to couple the casings 20 and 21 together. The section of the inner portions 39 is also trapezoidal and corresponds to the axial section of the annular groove 33.

The coupling means 32b for securing the intermediate casing 21 and the rearward casing 22 together is illustrated in FIG. 2b, and is essentially the same as the coupling means 32a. The only difference lies in the fact that since the rearward casing 22 is divided into two sectors 22a and 22b, the ring 36a and the collar 38a are also correspondingly divided in two.

It will be readily appreciated that when the forward casing 20 is open, the contrarotating propellers 8 and 9 are easily accessible. They can then be removed to provide easy access to the reducing gear 7. If, in addition, the rearward casing 21 is opened, the means securing the plate 31 of the forward attachment means 29 are accessible both from the front and from the rear of the intermediate casing 21, and the fixing means of the plate 31 of the rear attachment means 30 are also accessible from both the front and the rear as a consequence of the fact that the parts 26a and 26b of the rear ring 26 of the inner cowling 11 are opened with the rearward casing 22.

Figure 6:
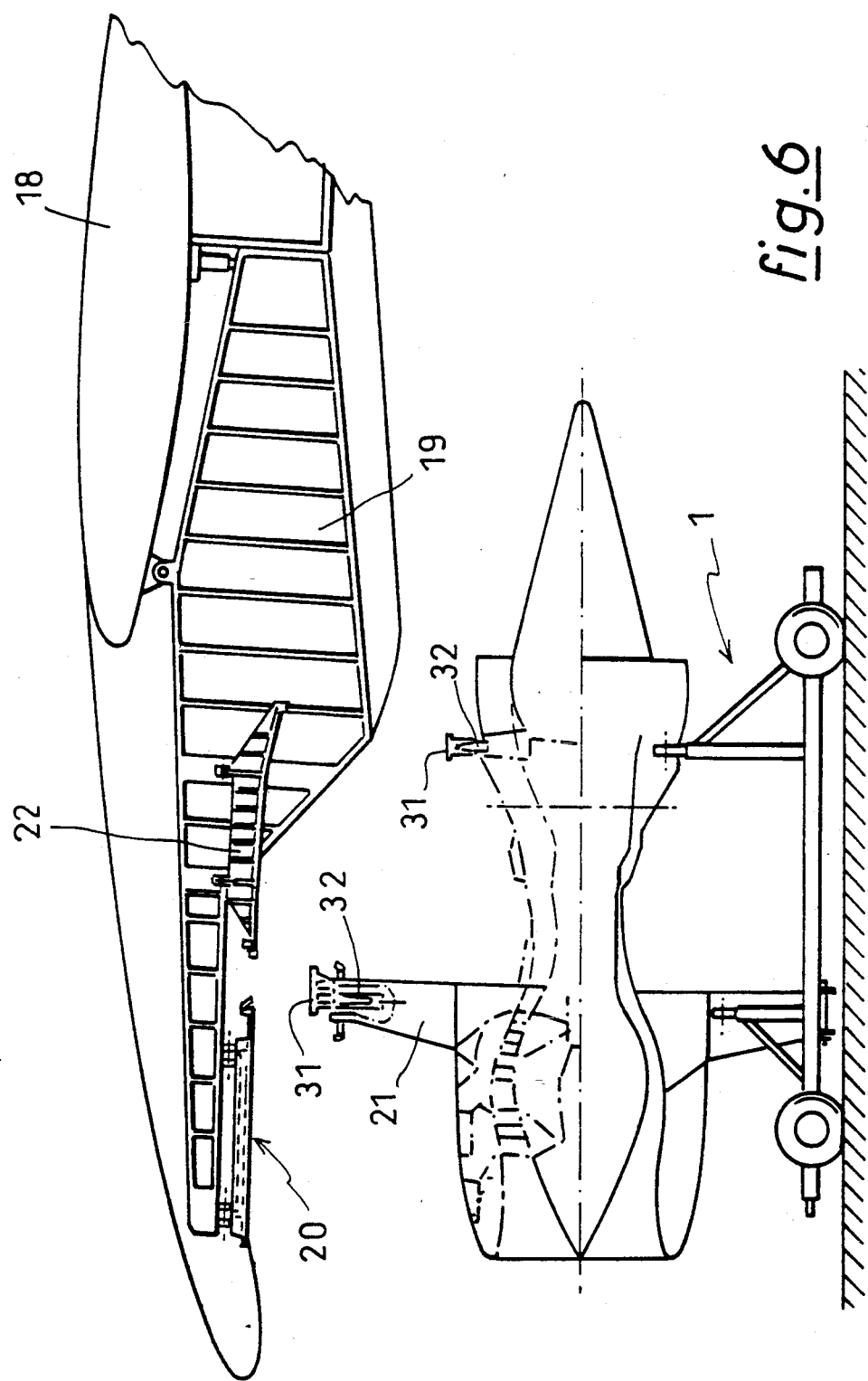
FIG. 6 is a longitudinal sectional view showing the turbojet engine unit separated from the suspension mast.
Figure 7:
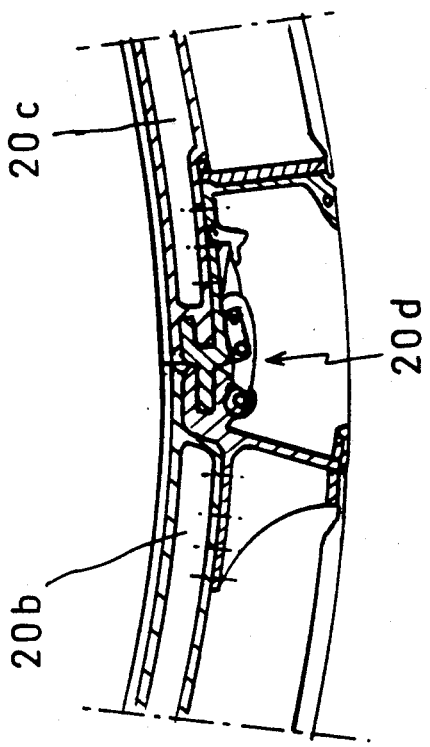
FIG. 7 is a scrap sectional view showing the means for locking the movable parts of the forward or rearward casing together when the casing is closed.
Figure 8:
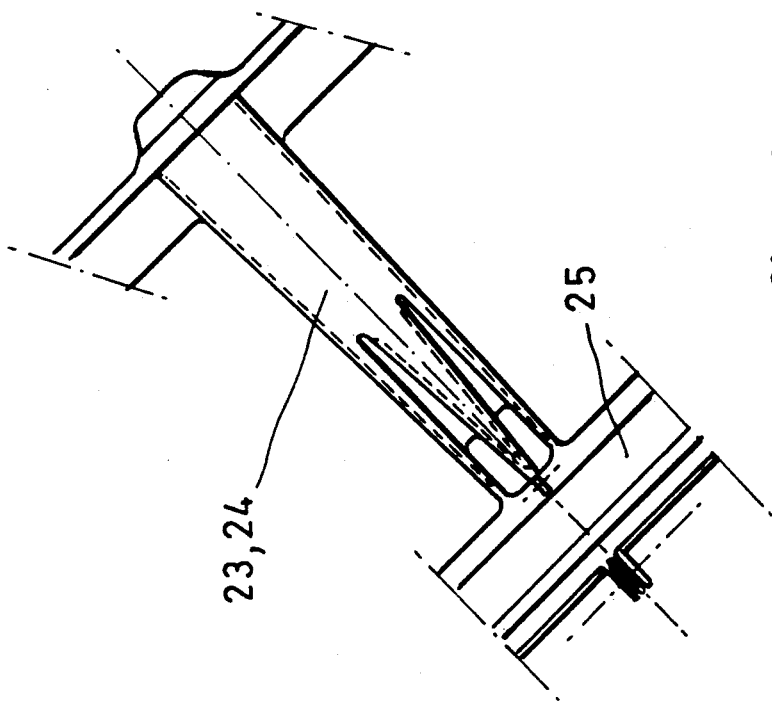
FIG. 8 is a scrap view showing the hingeing of the movable parts of the forward casing on the fixed upper sector of the forward casing.

FIGS. 5 and 6 show the engine unit 1 supported on a carriage 40 situated below the suspension mast 19 and the open components of the pod 16 attached thereto. The mounting of the engine unit on the suspension mast 19 is achieved using the reverse of the removal procedure.

What is claimed is:

1. A pod for a very high bypass ratio turbofan engine unit of the forward contrafan type suspended from a suspension mast under the wing of an aircraft, said engine unit including an engine casing, a pair of ducted fans having contrarotating propellers disposed at the forward end of said engine unit, and radial flow straightener arms disposed to the rear of said propellers, said flow straightener arms extending radially outwards from said engine casing, said pod comprising an inner cowling of generally cylindrical shape surrounding said engine casing, an outer cowling also of generally cylindrical shape, said outer casing having an outer side forming the outer wall of said pod and an inner side spaced radially outwardly from said inner cowling and defining therebetween a cold flow path of said engine unit in which said contrarotating propellers and said flow straightener arms are located, and said outer cowling comprising a forward casing forming the front part of said pod and surrounding said fan propellers, said forward casing being rigidly connected to said suspension mast and being openable to facilitate maintenance work, a structural intermediate casing situated to the rear of said forward casing and rigidlY connected to said engine casing by means of said flow straightener arms, and a rearward casing situated to the rear of said intermediate casing and rigidly connected to said suspension mast, said rearward casing also being openable to facilitate maintenance work, said engine unit having first and second attachment means by which said engine unit is hitched to said suspension mast, said first attachment means being provided on the upper part of said intermediate casing, and said second attachment means being provided on the rear part of said engine casing, first coupling means for rigidly connecting said forward casing to said intermediate casing when said engine unit is hitched to said suspension mast and said forward casing is closed, and second coupling means for rigidly connecting said rearward casing to said intermediate casing when said engine unit is hitched to said suspension mast and said rearward casing is closed.

2. A pod according to claim 1, wherein said first attachment means comprises a first detachable plate secured to said suspension mast, and suspension links connecting said first plate to said intermediate casing.

3. A pod according to claim 1, wherein said second attachment means comprises a second detachable plate secured to said suspension mast, and suspension links connecting said second plate to said engine casing.

4. A pod according to claim 1, wherein said openable forward casing of said outer cowling is divided into a plurality of sectors, and said first coupling means comprises a first annular groove provided in the outer cylindrical face of said intermediate casing near the forward end face of said intermediate casing, and a plurality of first flanges carried by said sectors of said forward casing in an overhanging manner on the rear end faces of said sectors, said first flanges forming a ring which engages in said first annular groove when said engine unit is hitched to said suspension mast and said forward casing is closed.

5. A pod according to claim 1, wherein said openable rearward casing of said outer cowling is divided into a plurality of sectors, and said second coupling means comprises a second annular groove provided in the outer cylindrical face of said intermediate casing near the rearward end face of said intermediate casing, and a plurality of second flanges carried by said sectors of said rearward casing in an overhanging manner on the forward end faces of said sectors, said second flanges forming a ring which engages in said second annular groove when said engine unit is hitched to said suspension mast and said rearward casing is closed.

6. A pod according to claim 4, wherein said forward casing is divided into three 120° sectors, one of said sectors forming an upper sector which is disposed symmetrically relative to a vertical plane passing through the axis of said engine unit, said upper sector being fixed to said suspension mast.

7. A pod according to claim 6, wherein the other two of said sectors of said forward casing are each pivotally connected to said upper sector to form a movable shell which can be lifted laterally to open said forward casing, said two shell forming sectors having means for locking themselves together at the bottom when said forward casing is closed.

8. A pod according to claim 5, wherein said rearward casing comprises two streamlined structural sectors, and said two sectors are pivotally mounted on said suspension mast.

9. A pod according to claim 8, wherein said inner cowling is divided into forward and rearward parts, and said rearward part is itself divided into two sectors, each of said two sectors being rigidly connected to a respective one of said two sectors of said rearward casing of said outer cowling whereby said rearward part of said inner cowling is opened when said rearward casing of said outer cowling is opened.

* * * * *

UNITED STATES PATENT AND TRADEMARK OFFICE
CERTIFICATE OF CORRECTION

PATENT NO. : 5,157,915
DATED : OCTOBER 27, 1992
INVENTOR(S) : JACQUES R. BART

It is certified that error appears in the above-identified patent and that said Letters Patent is hereby corrected as shown below:

On the title page, Item [73], the Assignee is incorrect, it should read --Societe Nationale d'Etude et de Construction de Moteurs d'Aviation, "S.N.E.C.M.A.", Paris, France--.

In column 1, line 45, change "tubojet" to --turbojet--.

In column 2, line 42, change "bY" to --by--.

In column 3, line 13, change "ap parent" to --apparent--,
   line 41, change "hingeing" to --hinging--.
   line 52, change "drivinq" to --driving--.

In column 6, line 18, change "casing" to --cowling--,

UNITED STATES PATENT AND TRADEMARK OFFICE
CERTIFICATE OF CORRECTION

PATENT NO. : 5,157,915

DATED : OCTOBER 27, 1992

INVENTOR(S) : JACQUES R. BART

It is certified that error appears in the above-identified patent and that said Letters Patent is hereby corrected as shown below:

In column 6, line 31, change "rigidly" to --rigidly--.

Signed and Sealed this

Ninth Day of November, 1993

Attest:

BRUCE LEHMAN

Attesting Officer

Commissioner of Patents and Trademarks